United States Patent

Kurabayashi et al.

[11] Patent Number: 5,985,975
[45] Date of Patent: Nov. 16, 1999

[54] LIQUID COMPOSITION, INK SET AND METHOD AND APPARATUS FOR IMAGE BY USING THE COMPOSITION AND INK SET

[75] Inventors: Yutaka Kurabayashi, Tolorozawa; Katsuhiko Takahashi, Yokohama, both of Japan

[73] Assignee: Canon Kabushiki Kaisha, Tokyo, Japan

[21] Appl. No.: 08/587,519

[22] Filed: Jan. 17, 1996

[30] Foreign Application Priority Data

Jan. 31, 1995 [JP] Japan .................................. 7-013898
Jan. 5, 1996 [JP] Japan .................................. 8-000276

[51] Int. Cl.⁶ .............................. C08K 5/02; C11D 1/38
[52] U.S. Cl. .......................... 524/462; 524/463; 524/186; 524/236; 106/31.75; 106/31.88; 106/31.97; 106/31.89
[58] Field of Search .................... 524/236, 286, 524/462, 463; 106/31.01, 31.13, 31.75, 31.88, 31.97, 31.89

[56] References Cited

U.S. PATENT DOCUMENTS 5,498,657  3/1996  Sugiyama et al. .................. 524/463

FOREIGN PATENT DOCUMENTS

| 61-59911 | 5/1979 | Japan . |
| 61-59912 | 5/1979 | Japan . |
| 61-59914 | 2/1980 | Japan . |
| 55-65269 | 5/1980 | Japan . |
| 55-66976 | 5/1980 | Japan . |
| 63-22681 | 1/1988 | Japan . |
| 63-29971 | 2/1988 | Japan . |
| 63-60783 | 3/1988 | Japan . |
| 64-09279 | 1/1989 | Japan . |
| 64-63185 | 3/1989 | Japan . |
| 64-69381 | 5/1989 | Japan . |

*Primary Examiner*—Mark L. Warzel
*Attorney, Agent, or Firm*—Fitzpatrick, Cella Harper & Scinto

[57] ABSTRACT

The present invention provides a liquid composition containing a cationic fluorocarbon surfactant having a general formula [I] or [II] and a polymer compound in a solvent, and a liquid composition containing a cationic fluorocarbon surfactant having a general formula [III] and a polymer compound in a solvent:

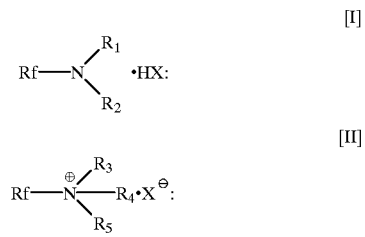

wherein Rf represents a fluorocarbon group in which at least some of the hydrogen atoms in an alkyl group having 4 to 12 carbon atoms are substituted by fluorine atoms, each of $R_1$, $R_2$, $R_3$, $R_4$, and $R_5$ represents a hydrogen atom or an alkyl group having 1 to 3 carbon atoms, HX represents a hydrohalogenic acid, and $X^\ominus$ represents a halogen anion;

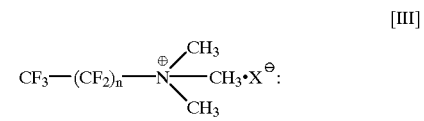

wherein n represents an integer from 4 to 12, and $X^\ominus$ represents a halogen anion.

The present invention further provides an ink set, in which the above liquid composition is combined with one or more inks, a method of forming an image and apparatus for forming the image by applying the ink set and liquid composition.

16 Claims, 5 Drawing Sheets

DIRECTION OF MOVEMENT OF CARRIAGE

LIQUID COMPOSITION, INK SET AND METHOD AND APPARATUS FOR IMAGE BY USING THE COMPOSITION AND INK SET

BACKGROUND OF THE INVENTION

1. Field of the Invention

The present invention relates to a technique of obtaining a water-resistant ink image and reducing the phenomenon known as color bleeding in the formation of a color image on plain paper. The present invention particularly relates to a liquid composition to be used for image formation which employs an ink-jet system, to an ink set comprising a combination of the liquid composition and at least one ink, and to image forming methods and apparatus which use the liquid composition and the ink set.

2. Related Background Art

In an ink-jet recording system, recording is performed by ejecting ink droplets and adhering the ink droplets to a recording medium such as paper or the like. Particularly, in the methods disclosed in Japanese Patent Publication Nos. 61-59911, 61-59912 and 61-59914 in which bubbles are generated by applying thermal energy to an ink using an electrothermal converter as discharge energy supply means, and the bubbles are used to discharge ink droplets, a high density multi-orifice recording head can be readily manufactured and can record high-resolution and high-definition images at high speed.

However, since the ink used for conventional ink-jet recording generally comprises water as a main component, and a water-soluble high-boiling point solvent such as glycol for drying and preventing clogging of the nozzle, the method has the drawbacks that sufficient fixing properties cannot be obtained when recording on plain paper using such an ink, and that a nonuniform image is produced, possibly due to nonuniform distribution of loading material and sizing agent on the surface of a recording sheet. Furthermore, in the case of color recording, when a plurality of color inks are successively superimposed on a sheet before one of the color inks is fixed to the recording sheet, there is the problem that a satisfactory image cannot be obtained due to color bleeding or nonuniform mixing at the boundary between images having different colors. (This phenomenon is referred to as "bleeding" hereinafter.)

To enhance the fixing properties, therefore, Japanese Patent Laid-Open No. 55-65269 discloses a method of adding a compound for increasing penetrability, such as a surfactant, to an ink. Japanese Patent Laid-Open No. 55-66976 discloses a method of using an ink comprising a volatile solvent as a main component. However, although the method of adding a surfactant or the like to the ink increases the penetrability of the ink into the recording paper and improves the fixing properties of the ink and decreases bleeding to some extent, the method also causes the problem of decreasing the image density and chroma due to deep penetration of the ink's coloring material into the recording sheet. The method also causes lateral spreading of the ink and consequently causes the problem of decreasing the edge sharpness or resolution. On the other hand, since the latter means of using an ink comprising a volatile solvent as a main component not only produces the same problems as the former method but also readily produces clogging of the recording head nozzle due to the evaporation of the solvent, it is undesirable.

Methods of adhering a liquid to a recording medium before ejection of the ink in order to improve image quality have been proposed for solving the aforementioned problems.

For example, Japanese Patent Laid-Open No. 63-60783 discloses a method of recording with an ink containing an anionic dye after adhering a liquid containing a basic polymer to recording paper, and Japanese Patent Laid-Open No. 63-22681 discloses a method of recording an image by mixing a first liquid containing a reactive chemical species and a liquid containing a compound having reactivity to the reactive chemical species on a recording medium. In addition, Japanese Patent Laid-Open No. 63-29971 discloses a method of recording with an ink containing an anionic dye after adhering a liquid containing an organic compound having at least two cationic groups per molecule to a recording medium. Japanese Patent Laid-Open No. 64-9279 discloses a method of recording with an ink containing an anionic dye after adhering an acid liquid containing succinic acid or the like to the recording medium.

Further, Japanese Patent Laid-Open Nos. 64-63185 and 64-69381 disclose a method of recording with an ink after applying a liquid which makes the dye insoluble.

However, since all of the above methods have been proposed for suppressing bleeding of an image and improving water resistance by depositing dyes themselves, these methods do not sufficiently prevent the above-described bleeding between different color inks. In addition, since the deposited dyes are liable to be distributed nonuniformly on the recording sheet, the formed image has poor coverage of the pulp fibers of the recording sheet, thereby reducing the uniformity of the image.

SUMMARY OF THE INVENTION

In consideration of the aforementioned situation, an object of the present invention is to achieve the five following goals.

Two goals regarding ink-jet recording on plain paper are:

(1) Improved character quality with maintenance of good fixing properties; and (2) Sufficient image density, and increased uniformity of solid images.

Goals for color image formation on plain paper are the above two and the following three goals:

(3) Prevention of bleeding;

(4) High-definition images with good color reproducibility; and (5) Complete water resistance of recorded images.

The above object can be achieved by the present invention. In accordance with a first aspect of the present invention, there is provided a liquid composition containing a cationic fluorocarbon surfactant represented by the formula [I] or [II] below, and a high-molecular weight substance in a liquid medium. In a second aspect of the invention, there is provided a liquid composition containing a cationic fluorocarbon surfactant represented by the formula [III] below, and a high-molecular weight substance.

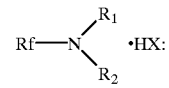

[I]

-continued

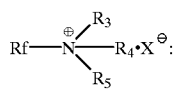
[II]

wherein Rf indicates a fluorocarbon group having an alkyl group with 4 to 12 carbon atoms and hydrogen atoms which are partly or entirely substituted by fluorine; $R_1$, $R_2$, $R_3$, $R_4$ and $R_5$ each indicate hydrogen or an alkyl group having 1 to 3 carbon atoms; HX indicates a hydrohalogenic acid; and $X^\ominus$ indicates a hydrohalogenic acid radical.

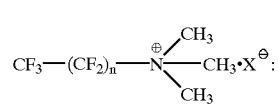
[III]

wherein n indicates an integer of 4 to 12, and $X^\ominus$ indicates a hydrohalogenic acid radical.

In a third aspect of the present invention, there is provided an ink set comprising a combination of a liquid composition in accordance with the first or second aspect of the present invention, and at least one of yellow, magenta, cyan, black, red, blue and green inks. In a fourth aspect of the present invention, there is provided an ink set comprising a combination of a liquid composition in accordance with the first or second aspect of the present invention, and inks of three colors, namely, yellow, magenta and cyan. In a fifth aspect of the present invention there is provided an ink set comprising a combination of a liquid composition in accordance with the first or second aspect of the present invention, and inks of four colors, namely, yellow, magenta, cyan and black.

In a sixth aspect of the present invention, there is provided an image forming method comprising the steps of (A) adhering a liquid composition in accordance with the first or second aspect of the invention to at least an image forming region of a recording medium, and (B) applying an ink containing at least an anionic compound to the recording medium by an ink-jet process.

In a seventh aspect of the present invention, there is provided an image forming apparatus comprising an ink set in accordance with any one of the third to fifth aspects of the invention, ink-jet means, a first recording unit having a storage portion and discharge means for a liquid composition according to the first or second aspect of the invention, and a second recording unit having a storage portion and discharge means for an ink containing at least an anionic compound.

DESCRIPTION OF THE PREFERRED EMBODIMENTS

Figure 1:
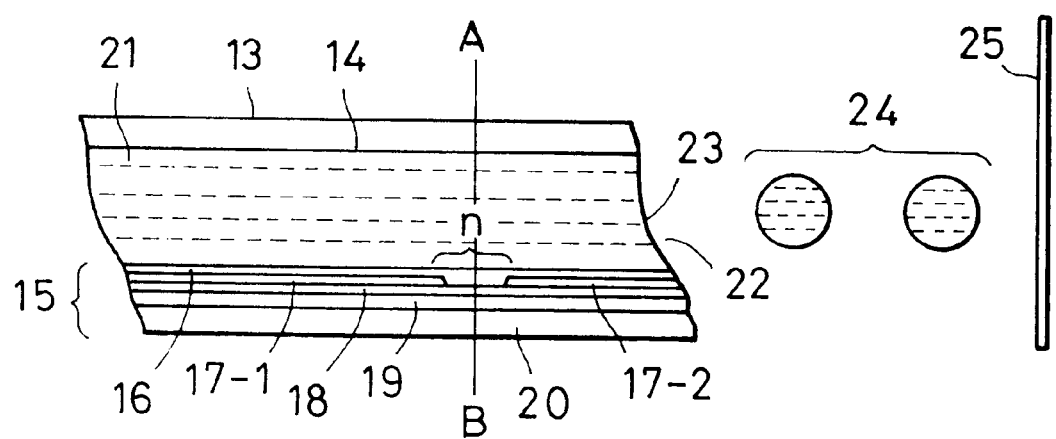
FIG. 1 is a longitudinal cross-sectional view showing a head unit of an ink-jet recording apparatus.

The function of the present invention will be described below.

When the above-described liquid composition containing no coloring material such as a dye or pigment in accordance with the present invention is mixed with an ink on a recording sheet or where the liquid composition and ink penetrate into the recording sheet, the cationic fluorocarbon surfactant contained in the liquid composition associates with a water-soluble dye having an anionic group, which is used in the ink or an anionic compound used in a pigment ink due to ionic interaction to instantaneously separate from a solution phase in the first stage of reaction. As a result, the pigment ink causes breaking of dispersion, and thus pigment aggregates.

In the second stage of reaction, since the association product of the dye and the cationic fluorocarbon surfactant or the aggregates of pigment are adsorbed by the high-molecular weight substance contained in the liquid composition, the size of the association product of the dye produced by association or the aggregates of pigment is further increased. This makes it difficult for the dye or pigment to penetrate between the fibers of the recording sheet. As a result, solid-liquid separation occurs, and thus only the liquid portion penetrates into the recording sheet, thereby achieving improvements in both print quality and fixing properties. As the same time, the viscosity of the associate product or aggregates, produced by the above-described mechanism is increased. As a result, since the association product or aggregates do not move with the liquid medium, if adjacent dots are formed by different color inks, the dots are not mixed with each other. Therefore, no bleeding occurs, unlike the above-described conventional methods of forming full-color images. Further, because the association product or aggregates are essentially water-insoluble, the formed image has complete water resistance.

The present invention is described in further detail below with reference to preferred embodiments of the invention.

The liquid composition of the present invention is first described.

The liquid composition of the present invention contains the following essential components:

(1) Cationic fluorocarbon surfactant; and
(2) High-molecular weight substance.

The liquid composition contains no coloring material such as a dye or pigment.

The ink used in the present invention is as follows:

(3) A dye ink containing a water-soluble dye having at least an anionic group; or
(4) A pigment ink containing a pigment and an anionic compound.

The action and effect of the above substances are as described above. The cationic fluorocarbon surfactant (1) associates with the water-soluble dye having an anionic group contained in the dye ink or the anionic compound contained in the pigment ink due to ionic interaction. It is necessary that the reaction of forming the association product proceeds at a very high rate.

Examples of the cationic fluorocarbon surfactant used as component (1) in the present invention include compounds represented by the following formula [I] or

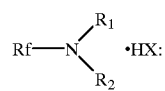

[I]

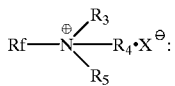

[II]

wherein Rf indicates a fluorocarbon group having an alkyl group having 4 to 12 carbon atoms and hydrogen atoms partly or wholly substituted by fluorine; $R_1$, $R_2$, $R_3$, $R_4$ and $R_5$ each indicate hydrogen or an alkyl group having 1 to 3 carbon atoms; HX indicates a hydrohalogenic acid (HCl, HBr or HI acid); and $X^\ominus$ indicates a hydrohalogenic acid (HCl, HBr or HI) radical.

Preferred examples of the cationic fluorine surfactant include compounds represented by the following formula [III].

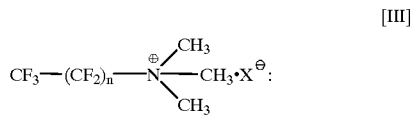

[III]

wherein n indicates an integer of 4 to 12, and $X^\ominus$ indicates a hydrohalogenic acid (HCl, HBr or HI) radical.

More preferred examples of the cationic fluorocarbon surfactant used in the present invention include compounds represented by the following formulae.

Compound No. 1

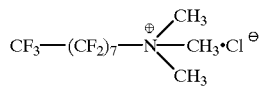

Compound No. 2

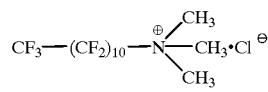

The content of the cationic fluorocarbon surfactant in the liquid composition of the present invention is generally within the range from 0.001 to 1.0% by weight, and preferably within the range from 0.005 to 0.2% by weight.

The low-molecular weight cationic substance below can be used for improving the effect of the present invention. Examples of such a substance are given below.

Preferred examples of the cationic substance include primary, secondary or tertiary amine salt compounds such as hydrochlorides and acetates of lauryl amine, coconut amine, stearyl amine, rosin amine and the like; quaternary ammonium salt compounds such as lauryltrimethylammonium chloride, lauryldimethylbenzylammonium chloride, benzyltributylammonium chloride, benzalkonium chloride, cetyltrimethylammonium chloride and the like; pyridinium salt compounds such as cetylpyridinium chloride, cetylpyridinium bromide and the like; imidazoline cationic compounds such as 2-heptadecenyl-hydroxyethylimidazoline and the like; ethyl oxide addition products of secondary alkyl amines such as dihydroxyethylstearylamine and the like.

In the present invention, amphoteric surfactants exhibiting cationic properties within a particular pH region can also preferably be used as low-molecular weight substances.

Examples of such surfactants include amino acid type amphoteric surfactants; $RNHCH_2$—$CH_2COOH$ type compounds; betaine compounds such as stearyldimethyl betaine, lauryldihydroxyethyl betaine and the like. When such amphoteric surfactants are used, it is necessary to adjust the pH of the liquid composition of the present invention to a value below the isoelectric point of the surfactant used, or to adjust the pH of the liquid composition to a pH value below the isoelectric point when mixed with the ink on the recording medium.

Although examples of the low-molecular weight cationic substance are described above, compounds which can be used in the present invention are not limited to these examples. Other examples of cationic substances include cationic oligomers having a molecular weight of not more than 1000.

The high-molecular weight substance is component (2) in accordance with the present invention has the above-described function and effect. Namely, in the second stage of reaction between the liquid composition and the ink, this substance adsorbs, in its molecule, the association product of the dye or the anionic compound contained in the pigment ink and the cationic fluorocarbon surfactant. This consequently increases the size of the dye aggregates or pigment aggregates produced by association, thereby making it difficult for them to penetrate into the spaces between the fibers of the recording sheet. Thus, since only the liquid portion produced by solid-liquid separation penetrates into the recording sheet, improvement in both printing quality and fixing properties can be achieved.

Examples of such high-molecular weight substances as component (2) include polyacrylamide which is a nonionic water-soluble high-molecular weight substance; polyvinyl pyrrolidone; water-soluble cellulose such as carboxymethyl cellulose, hydroxymethyl cellulose, hydroxypropyl cellulose and the like; polyvinyl methyl ether, polyvinyl acetal, polyvinyl alcohol and the like. As a matter of course, however, the high-molecular weight substances are not limited to these substances. It is sufficient for achieving the effect of the present invention that the high-molecular weight substance has a molecular weight of not less than 2000. However, it is more preferable that the high-molecular weight substance have a molecular weight of 2,000 to 10,000.

Other examples of the high-molecular weight substance include cationic high-molecular weight substances such as polyalkylamine hydrochloride, polyaminesulfone hydrochloride, polyvinylamine hydrochloride, chitosan acetate and the like. As a matter of course, the high-molecular weight substances used in the present invention are not limited to these substances.

Nonionic high-molecular weight compounds which are partly made cationic can also be used as the high-molecular weight cationic substances.

Examples of such compounds include copolymers of vinylpyrrolidone and aminoalkylalkylate quaternary salts, copolymers of acrylamide and aminomethylacrylamide quaternary salts and the like.

Although the high-molecular weight substances are preferably water-soluble, these substances may be a dispersion such as a latex or emulsion.

The molecular weight of the high-molecular weight substance used in the present invention is a weight average molecular weight which is measured by GPC (Gel Permeation Chromatography) using polyethylene oxide as a standard.

The amount of each of the components contained in the liquid composition of the present invention is preferably within the range of 0.05 to 20% by weight, and more preferably within the range of 0.5 to 5% by weight. However, the optimum range must be selected according to the combination of the substances used.

The cationic surfactants below may be further contained in the liquid composition in order to further improve the effect of the invention.

Examples of such cationic surfactants include primary, secondary or tertiary amine salt compounds such as hydrochlorides and acetates of lauryl amine, coconut amine, stearyl amine, rosin amine and the like; quaternary ammonium salt compounds such as lauryltrimethylammonium chloride, lauryldimethylbenzylammonium chloride, benzyltributylammonium chloride, benzalkonium chloride and the like; pyridinium salt compounds such as cetylpyridinium chloride, cetylpyridinium bromide and the like; imidazoline cationic compounds such as 2-heptadecenyl-hydroxyethylimidazoline and the like; ethylene oxide addition products of higher alkyl amines such as dihydroxyethylstearylamine and the like.

In the present invention, amphoteric surfactants exhibiting the cationic properties within a particular pH region can also preferably be used. Examples of such surfactants include amino acid type amphoteric surfactants; $RNHCH_2$—$CH_2COOH$ type compounds; betaine compounds such as carboxylic acid type amphoteric surfactants such as stearyldimethyl betaine, lauryldihydroxyethyl betaine and the like; other amphoteric surfactants such as sulfate, sulfonic acid, phosphate type surfactants and the like. When such amphoteric surfactants are used, it is necessary to adjust the pH of the liquid composition of the present invention to a value below the isoelectric point of the surfactant used, or to adjust the pH of the liquid composition to a pH value below the isoelectric point when mixed with the ink on the recording medium.

Other components of the liquid composition of the present invention are described below.

The liquid composition of the present invention generally contains water, a water-soluble organic solvent and appropriate additives other than the above-described components. Examples of water-soluble organic solvents which can be used include amides such as dimethylformamide, dimethylacetamide, and the like; ethers such as tetrahydrofuran, dioxane and the like; polyalkylene glycols such as polyethylene glycol, polypropylene glycol and the like; alkylene glycols such as ethylene glycol, propylene glycol, butylene glycol, triethylene glycol, 1,2,6-hexanetriol, thiodiglycol, hexylene glycol, diethylene glycol and the like; lower alkyl ethers of polyhydric alcohols such as ethylene glycol methyl ether, diethylene glycol monomethyl ether, triethylene glycol monomethyl ether and the like; monohydric alcohols such as ethanol, isopropyl alcohol, n-butyl alcohol, isobutyl alcohol and the like; glycerin; N-methyl-2-pyrrolidone; 1,3-dimethylimidazolidinone; triethanolamine; sulfolane; dimethylsulfoxide and the like.

Although the content of the water-soluble organic solvent is not limited, it is present preferably within the range of 5 to 60% by weight, more preferably 5 to 40% by weight, of the total weight of the liquid composition.

The liquid composition of the present invention may further contain appropriate additives such as a viscosity modifier, a pH adjustor, a preservative, various surfactants, an antioxidant and an evaporation accelerator, if required. Selection of a surfactant is particularly important for adjusting the penetrability of the liquid into the recording medium.

The liquid composition of the present invention contains no coloring material such as a dye or pigment, and it has a color tone which causes no change in tone of the recording ink. The liquid composition also has various physical properties at about 25° C. such as a pH within the range of 3 to 12, preferably the range of 3 to 8, more preferably the range of 3 to 5; a surface tension within the range of 10 to 60 dyne/cm, and more preferably within the range of 10 to 40 dyne/cm; and a viscosity within the range of 1 to 30 cps.

The recording ink (3) used in the present invention is described below.

The recording ink (3) used in the present invention contains the above-described water-soluble dye having an anionic group, water, the water-soluble organic solvent and other components such as a viscosity modifier, a pH adjustor, a preservative, a surfactant, and an antioxidant, as necessary.

Any of the water-soluble acid dyes, direct dyes and reactive dyes described in The Color Index and having an anionic group can be used as the water-soluble dye of the present invention. Dyes which are not described in The Color Index and which have an anionic group, e.g., a sulfone or carboxyl group, can also be used without limitation. Such water-soluble dyes, of course, include dyes having pH-dependent solubility.

The same water-soluble organic solvents as those used for the liquid composition of the present invention can be used as water-soluble organic solvents in the inks. The preferable content range of the water-soluble organic solvent in the ink is the same as that of the liquid composition, and the preferable ranges of physical properties of the ink are also the same as those of the liquid composition.

In order to more effectively achieve the effect of the present invention, an anionic surfactant or cationic high-molecular weight substance other than the above components may be added to the ink. Alternatively, an amphoteric surfactant which is adjusted to a pH value lower than its isoelectric point may be used. Examples of anionic surfactants include conventional surfactants such as carboxylate type, sulfonate type, sulfate type and phosphate type surfactants. Examples of anionic high-molecular weight compounds include such as alkali-soluble resins such as polyacrylic soda, and polymers copolymerized with acrylic acid. However, the anionic high-molecular weight compounds are not limited to these compounds.

The recording ink (4) in accordance with another embodiment of the present invention is described.

The recording ink (4) contains water, a water-soluble organic solvent and other components such as a viscosity modifier, a pH modifier, a preservative, a surfactant, and antioxidant other than the pigment and anionic compound, if necessary. The anionic compound may be a dispersant for the pigment, and when the dispersant for the pigment is not an anionic compound, an anionic compound different from the dispersant may be added. When the dispersant is an anionic compound, another anionic compound may be further added.

The pigment which can be used in the present invention is not limited. Preferable examples of such pigments include the following:

A preferable example of carbon black used for a black pigment ink is carbon black which is produced by a furnace method or a channel method and wherein the primary particle size is 15 to 40 $\mu$m, the specific surface area measured by the BET (Brunauer-Emmett-Teller) method is 50 to 300 m$^2$/g, the DBP (Dibutylphthalate) oil absorption is 40 to 150 ml/100 g, the volatile component is 0.5 to 10%, and the pH value is 2 to 9. Examples of commercially available carbon black having such properties include No.

2300, No. 900, MCF88, No. 40, No. 52, MA7, MA8 and No. 2200B (produced by Mitsubishi Kasei); RAVEN1255 (produced by Colombia); REGAL400R, REGAL660R and MOGUL L (produced by Cabot); Color Black FW1, Color Black FW18, Color Black S170, Color Black S150, Printex 35 and Printex U (produced by Degusa). Carbon black which is newly produced for the present invention can be used.

Examples of pigments used for a yellow ink include C. I. Pigment Yellow 1, C. I. Pigment Yellow 2, C. I. Pigment Yellow 3, C. I. Pigment Yellow 13, C. I. Pigment Yellow 16 and C. I. Pigment Yellow 83. Examples of pigments used for a magenta ink include C. I. Pigment Red 5, C. I. Pigment Red 7, C. I. Pigment Red 12, C. I. Pigment Red 48 (Ca), C. I. Pigment Red 48 (Mn), C. I. Pigment Red 57 (Ca), C. I. Pigment Red 112 and C. I. Pigment Red 122. Examples of pigments used for a cyan ink include C. I. Pigment Blue 1, C. I. Pigment Blue 2, C. I. Pigment Blue 3, C. I. Pigment Blue 15:3, C. I. Pigment Blue 16, C. I. Pigment Blue 22, C. I. Vat Blue 4 and C. I. Vat Blue 6. Pigments which are newly produced for the present invention can be used. Each of the pigments is preferably used in an amount of 1 to 20% by weight, more preferably 2 to 12% by weight, of the total amount of the ink.

Any water-soluble resin can be used as a dispersant for the pigment contained in the ink used in the present invention, but resins having a weight average molecular weight within the range of 1,000 to 30,000, more preferably within the range of 3,000 to 15,000, can preferably be used. Examples of such dispersants include block copolymers, random copolymers, graft copolymers and salts thereof comprising at least two monomers selected from hydrophobic monomers such as styrene, styrene derivatives, biphenylnaphthalene, biphenylnaphthalene derivatives, aliphatic alcohol esters of α, β-ethylenic unsaturated carboxylic acids and the like; acrylic acid; acrylic acid derivatives; maleic acid; maleic acid derivatives; itaconic acid; itaconic acid derivatives; fumaric acid; and fumaric acid derivatives. These resins are soluble in an aqueous solution in which a base is dissolved, and are alkali-soluble resins. Homopolymers and salts thereof comprising hydrophilic monomers, and water-soluble resins such as polyvinyl alcohol, carboxymethyl cellulose, naphthalenesulfonic acid-formaldehyde condensation products and the like may be used. However, the use of an alkali-soluble resin has the advantages that the viscosity of the resultant dispersion can be decreased, and that dispersion can easily be performed. The water-soluble resin is preferably used in an amount within the range of 0.1 to 5% by weight of the total amount of the ink.

The entire ink of the present invention is preferably adjusted to be neutral or alkali because the solubility of the water-soluble resin is improved, and the long-term storage stability of the ink can be further improved. The pH is more preferably within the range of 7 to 10.

Examples of pH adjustors include various organic amines such as diethanolamine, triethanolamine and the like; inorganic alkali agents such as such as hydroxides of alkali metals such as sodium hydroxide, lithium hydroxide, potassium hydroxide and the like; organic acids; mineral acids and the like.

As described above, the pigment and the water-soluble resin are dispersed or dissolved in a water-soluble medium.

An aqueous liquid medium preferable for the ink (4) of the present invention is a solvent mixture of water and a water-soluble organic solvent. It is preferable to use ion-exchanged water (deionized water), instead of water containing various ions.

Examples of water-soluble organic solvents used in a mixture with water include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones or ketone alcohols such as acetone, diacetone alcohol and the like; ethers such as tetrahydrofuran, dioxane and the like; polyalkylene glycols such as polyethylene glycol, polypropylene glycol and the like; alkylene glycols each having an alkyl group having 2 to 6 carbon atoms, such as ethylene glycol, propylene glycol, butylene glycol, triethylene glycol, 1,2,6-hexanetriol, thiodiglycol, hexylene glycol, diethylene glycol and the like; glycerin; lower alkyl ethers of polyhydric alcohols such as ethylene glycol monomethyl (or ethyl) ether, diethylene glycol methyl (or ethyl) ether, triethylene glycol monomethyl (or ethyl) ether and the like; N-methyl-2-pyrrolidone; 2-pyrrolidone; 1,3-dimethyl-2-imidazolidinone and the like. Of these water-soluble organic solvents, polyhydric alcohols such as diethylene glycol, and lower alkyl ethers of polyhydric alcohols such as triethylene glycol monomethyl (or ethyl) ether and the like are preferred.

It is effective for obtaining discharge stability to add at least 1% of ethanol or isopropyl alcohol to the ink. This is probably because the addition of such a solvent permits stable foaming of the ink on a thin film resistor. However, since the addition of excessive solvent deteriorates printing quality, the appropriate concentration of the solvent is 3 to 10% by weight. The addition of such a solvent to the dispersion also has the effect of suppressing foaming in the dispersion, and thus enabling efficient dispersion.

The content of the water-soluble organic solvent in the ink of the present invention is generally within the range of 3 to 50% by weight, and preferably within the range of 3 to 40% by weight, of the total weight of the ink. The content of the water used is within the range of 10 to 90% by weight, and preferably within the range of 30 to 80% by weight.

When the dispersant used is not an anionic high-molecular weight substance, it is necessary to further add an anionic compound to the ink containing the pigment. Preferable examples of such anionic compounds that can be used in the present invention include high-molecular weight substances such as alkali-soluble resins, which were described above for the pigment dispersant, and low-molecular weight anionic surfactants.

Examples of such low-molecular weight surfactants include disodium lauryl sulfosuccinate, disodium polyoxyethylene lauroylethanolamide ester sulfosuccinate, disodium polyoxyethylene alkylsulfosuccinate, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfate, sodium alkylsulfate, triethanolamine alkylsulfate and the like. However, the anionic surfactants are not limited to these compounds.

The amount of the anionic substance used is preferably within the range of 0.05 to 10% by weight, and more preferably within the range of 0.05 to 5% by weight, of the total amount of the ink.

The ink of the present invention may further contain a surfactant, an antifoaming agent, a preservative, etc., which are added for obtaining desired physical property values, in accordance with demand. A commercially available water-soluble dye can also be added to the ink.

Examples of surfactants include anionic surfactants such as aliphatic acid salts, higher alcohol sulfates, liquid aliphatic oil sulfates, alkyl allyl sulfonates, and the like; nonionic surfactants such as polyoxyethylene alkyl ethers, polyoxyethylene alkyl esters, polyoxyethylene sorbitan alkyl esters, acetylene alcohol, acethylene glycol and the like. At least one of these surfactants can appropriately be selected and used. Although the amount of the surfactant depends upon the dispersant used, it is preferably 0.01 to 5% by weight of the total amount of the ink. At this time, the amount of the surfactant added is preferably determined so that the surface tension of the ink is not less than 30 dyne/cm. This is because a value of surface tension lower than this value causes the problem of printing shift (shift of the adhesion point of the ink droplets) due to wetting of the nozzle tip in the recording system employed in the present invention.

The method of forming the ink (4) of the present invention comprises adding a pigment to an aqueous solution containing at least a dispersion resin and water, agitating the resultant mixture, dispersing it by using a dispersion means, which will be described below, and, if required, performing centrifugation, to obtain the desired dispersion. The above-described components are then added to the dispersion, and the dispersion is then agitated to form the ink.

When an alkali-soluble resin is used, a base must be added for dissolving the resin. It is necessary to add an amine or base for dissolving the resin in an amount which is more than the amount of the amine or base determined by calculation from the acid value or the resin. The amount of the amine or base added is determined by the following equation:

Amount of amine or base (g)=(acid value of resin x the molecular weight of amine or base x amount of resin (g))/5600.

It is also effective to premix the aqueous solution containing the pigment for 30 minutes before the dispersion treatment. The premixing operation is preferable because it improves the wettability of the pigment surface, and promotes adsorption of the dispersant to the pigment surfaces.

Preferable examples of bases which are added to the dispersion when the alkali-soluble resin is used include organic amines such as monoethanolamine, diethanolamine, triethanolamine, aminomethyl propanol, ammonia and the like; inorganic salts such as potassium hydroxide, sodium hydroxide and the like.

Any dispersion machines which are generally used can be used for dispersion treatment in the present invention. Examples of dispersion machines include a ball mill, a sand mill and the like. Of these machines, a high-speed sand mill is preferably used. Super Mill, Sand Grinder, Beads Mill, Agitator Mill, Grain Mill, Dyno Mill, Pearl Mill and Cobol Mill (all of which are trade names) are examples of high-speed sand mills.

The recording medium used in carrying out the present invention is not limited, and conventionally used plain paper such as copy paper, bond paper and the like can preferably be used. Special coated paper produced for ink-jet recording and OHP (Over Head Projection) transparent films can also preferably be used. Superior paper and glossy paper can also preferably be used.

Any image forming method can be used in the present invention as long as it provides for coexistence of the liquid composition and the ink on the recording medium. Therefore, it does not matter whether the liquid composition or the ink is first adhered to the recording medium.

In the present invention, "image-forming region" means a region to which ink dots are adhered, and "vicinity of the image-forming region" means a region having a width corresponding to 1 to 5 dots outside the region to which ink dots are to be adhered.

The liquid composition may be applied to the entire surface of the recording medium by spraying or by a roller. However, it is more preferable to employ an ink-jet process in which the liquid composition can be adhered selectively and uniformly to only the image-forming region to which the ink is adhered or the image-forming region and its vicinity.

Although the time between the adhesion of the ink and the adhesion of the liquid composition to the recording medium is not limited, the time is preferably not more than several seconds, and more preferably not more than 1 second, for more effectively carrying out the invention. This applies to the case where the liquid composition is adhered after the ink is adhered to the recording medium.

Various ink-jet recording systems can be used for adhering the liquid composition to the recording medium, but a so-called on-demand type thermal injection system in which droplets are discharged by bubbles generated by heat energy is particularly preferable.

Figure 2:
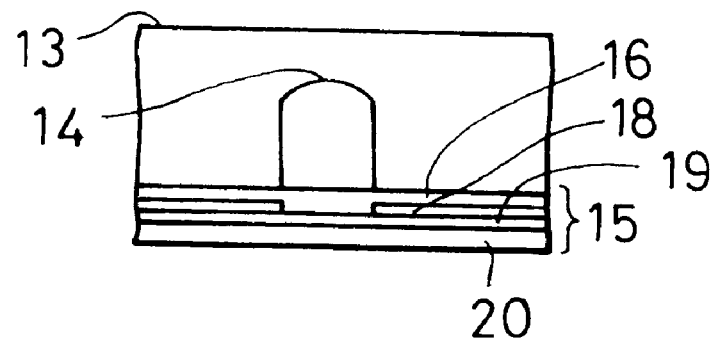
FIG. 2 is a lateral cross-sectional view showing a head portion of an ink-jet recording apparatus.
Figure 3:
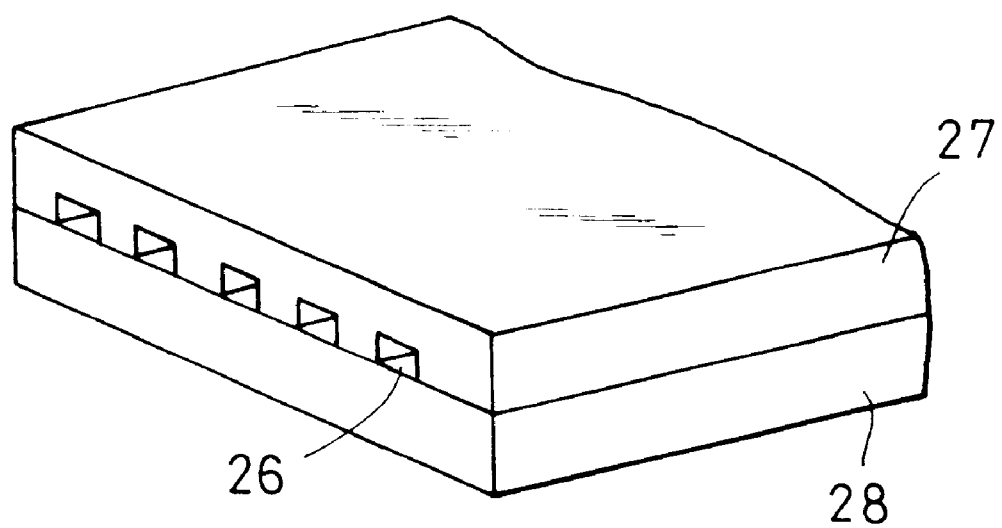
FIG. 3 is a perspective view of a head unit of an ink-jet recording apparatus.

The recording apparatus used in the present invention is described below. The present invention preferably employs the on-demand type thermal injection system in which droplets are discharged by the heat energy generated when a recording signal is applied to an ink in a recording head. FIGS. 1, 2 and 3 show the construction of a recording head which is an essential portion of such a recording apparatus.

A head 13 is formed by bonding a glass, ceramic or plastic plate in which an ink passage is formed, to a heating head 15 (the heating head is not limited to that shown in the drawings) having a heating resistor used for heat-sensitive recording. The heating head 15 comprises a protective film 16 consisting of silicon oxide or the like, aluminum electrodes 17-1 and 17-2, a heating resistor layer 18 consisting of nichrome, a heat accumulating layer 19, and a substrate 20 consisting of alumina or the like exhibiting good heat radiation.

A recording ink 21 reaches a discharge orifice 22 and forms a meniscus 23 under pressure.

When an electric signal is applied to the electrodes 17-1 and 17-2, a portion n of the heating head 15 rapidly generates heat, and bubbles are produced in the ink 21 in contact with the portion n. The meniscus 23 is discharged as recording liquid droplets 24 from the orifice 22 due to the pressure generated. The droplets 24 are ejected toward a recording material 25. FIG. 3 is a schematic drawing showing a recording head in which many nozzles shown in FIG. 1 are arranged. The recording head comprises a glass plate 27 having many passages and the same heating head 28 as that shown in FIG. 1, which are bonded to each other.

FIG. 1 is a sectional view of the head 13 taken along the ink flow passage, and FIG. 2 is a sectional view taken along line A–B of FIG. 1.

Figure 4:
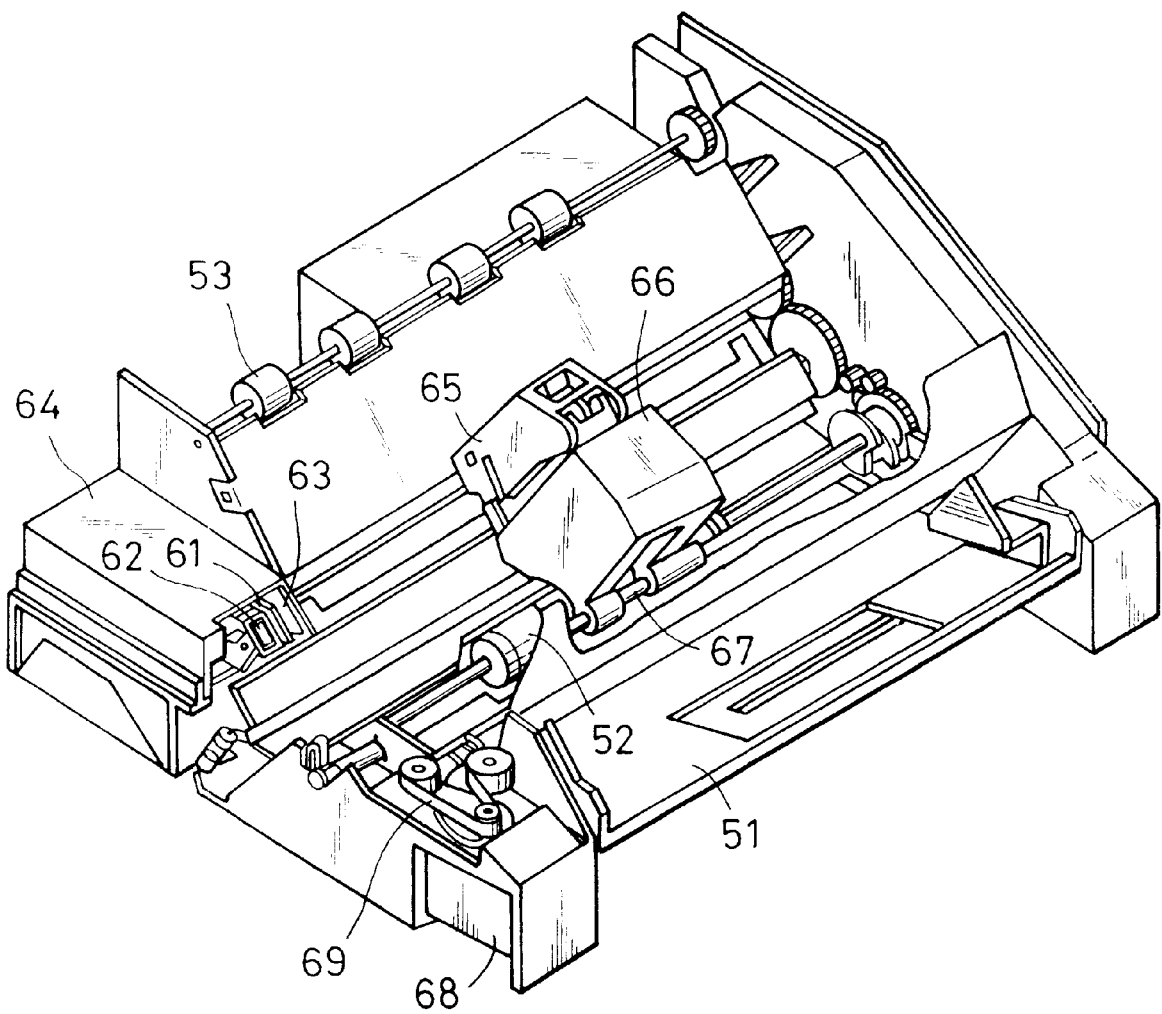
FIG. 4 is a perspective view showing an example of an ink-jet recording apparatus.

FIG. 4 shows an example of an ink-jet recording apparatus in which the head is assembled.

In FIG. 4, a blade 61 is a wiping member in a cantilever form in which one end thereof is a fixed and held by a blade holding member. The blade 61 is disposed adjacent to the region of recording by the recording head so as to move in the direction perpendicular to the direction of movement of the recording head. A capping device is provided for capping a discharge orifice surface in contact therewith. An ink absorber 63 is provided adjacent to the blade 61 and, like the blade 61, is held so as to project into the path of movement of the recording head. The blade 61, the cap 62 and the absorber 63 form a discharge recovery portion 64, and the blade 61 and the absorber 63 function to remove moisture and dust from the ink discharge orifice surface.

A recording head 65 has discharge energy generation means, for recording by discharging the ink to a recording material opposite to the discharge orifice surface on which discharge orifices are arranged. Carriage 66 moves the recording head 65 mounted thereon. The carriage 66 is oscillatably engaged with a guide shaft 67 and is partly connected (not shown) to a belt 69 driven by a motor 68. This permits the movement of the carriage 66 along the guide shaft 67 and the movement of the recording head 65 within the region of recording and the region adjacent thereto.

A feeding portion 51 is used for inserting a recording material. A feed roller 52 is driven by a motor (not shown). In this structure, the recording material is fed to a position opposite to the discharge orifice surface of the recording head, and is delivered to a delivery portion provided with delivery rollers 53 as recording progresses.

In the above-described construction, when the recording head 65 returns to a home position at the end of recording, the cap 62 of the head recovery portion 64 is retracted from the path of movement of the recording head 65, while the blade 61 is projected into the path of movement. As a result, the discharge orifice surface of the recording head is wiped. When the discharge orifice surface of the recording head 65 is capped with the cap 62, the cap is moved so as to project into the path of movement of the recording head 65.

When the recording head 65 is moved from the home position to the recording start position, the cap 62 and the blade 61 are at the same positions as they are in the wiping operation. As a result, in this movement, the discharge orifice surface of the recording head 65 is also wiped.

The recording head is moved to the home position not only when recording is completed and for discharge recovery, but it is also moved to the home position adjacent to the recording region at predetermined intervals during the movement of the recording head for recording within the recording region. The wiping operation is performed in conjunction with this movement to the home position.

Figure 5:
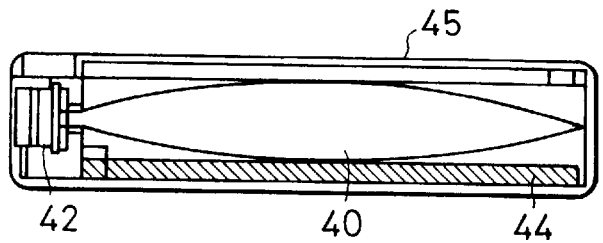
FIG. 5 is a longitudinal cross-sectional view of an ink cartridge.

FIG. 5 illustrates an example of an ink cartridge for containing an ink to be supplied to the head through an ink supply member, for example, a tube. In FIG. 5, an ink-containing portion 40, for example, an ink bag, contains an ink to be supplied. A rubber stopper 42 is provided at the end of the ink-containing portion 40. A needle (not shown) is inserted into the stopper 42 so that the ink contained in the ink bag 40 can be supplied to the head. An absorber 44 receives waste ink.

The ink-containing portion preferably has an ink contact surface made of a polyolefin, particularly, polyethylene.

Figure 6:
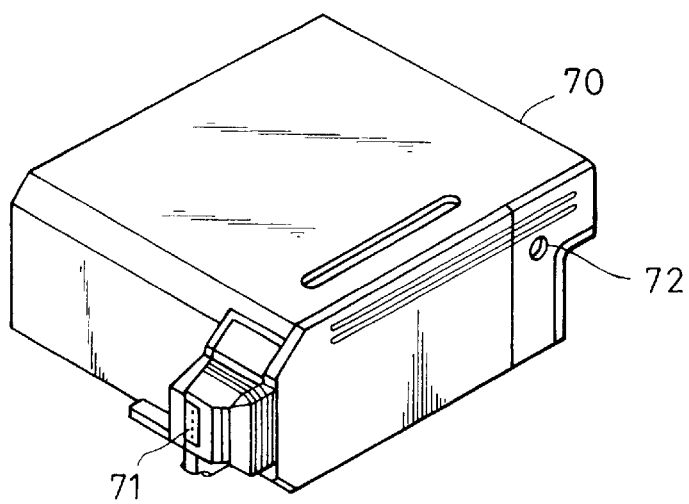
FIG. 6 is a perspective view of a recording unit.

An apparatus in which the head and the ink cartridge are integrated as shown in FIG. 6 can preferably be used as the ink-jet recording apparatus, as well as an apparatus in which the head and the ink cartridge are separately provided, as described above.

In FIG. 6, a recording unit 70 contains an ink-containing portion, for example, an ink absorber, for containing an ink. The ink contained in the ink absorber is discharged as ink droplets from a head portion 71 having a plurality of orifices. For example, polyurethane can be used as a material for the ink absorber. An atmospheric communication hole 72 communicates the inside of the recording unit with the atmosphere. This recording unit 70 can be used in place of the recording head shown in FIG. 4, and is detachable from the carriage 66. Although an ink-jet recording apparatus in which heat energy is applied to an ink to discharge ink droplets is used as an example of the recording apparatus used in the present invention, another ink-jet recording apparatus of the piezo type which uses a piezoelectric element can alternatively be used in the same manner.

Figure 7:
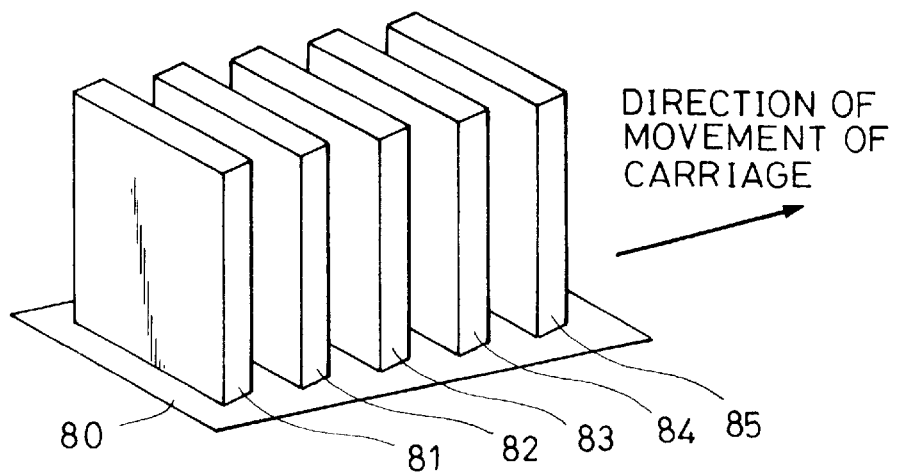
FIG. 7 is a perspective view of a recording unit comprising a plurality of recording heads used in an embodiment of the present invention.
Figure 8:
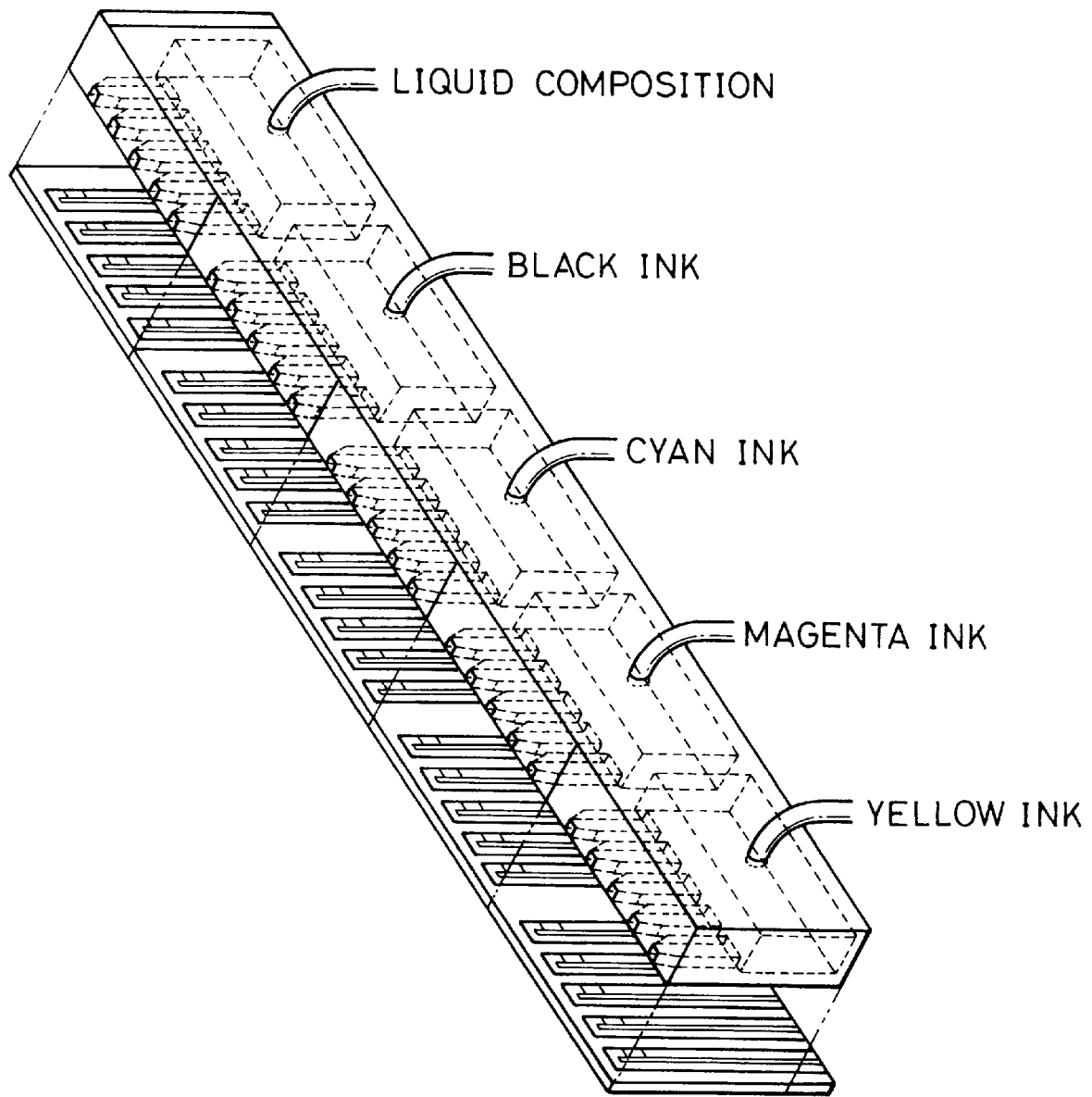
FIG. 8 is a perspective view of another recording head used in the present invention.

To perform the image forming method of the present invention, for example, a recording apparatus comprising five recording heads as shown in FIG. 3, arranged on a carriage 80, may be used. FIG. 7 shows an example of such a recording apparatus. Recording heads 81, 82, 83 and 84 discharge inks of yellow, magenta, cyan and black, respectively, and head 85 discharges the liquid composition. The heads are disposed in the recording apparatus so as to respectively discharge color inks in response to recording signals. The liquid composition is previously adhered to at least a portion the recording paper to which each of the color inks will be adhered. The example shown in FIG. 7 uses five recording heads, but a recording apparatus suitable for use in the present invention is not limited to this apparatus. It is also preferable to use a single long recording head which is divided to form liquid passages for yellow, magenta, cyan and black inks and for the liquid composition, as shown in FIG. 8.

A head may be, of course, arranged so that the recording order of the liquid composition and the inks is reversed.

EXAMPLES

The present invention will now be explained in more detail using EXAMPLES and a COMPARATIVE EXAMPLE.

Example 1

The components described below were well mixed to dissolve each other, and the mixture was filtered under pressure with a membrane filter having a pore size of 0.22 $\mu$m made by Sumitomo Electric Industries, Ltd., brand name: FLUOROPORE-FILTER, to obtain a liquid composition A1.

The composition of A1

Cationic fluorocarbon surfactant: Compound No. 1 0.5 phr

Polymer: polyvinyl pyrrolidone (brand name: PVP-K-15, International Specialty Products, Mw=8,000) 5.0 phr Thiodiglycol 10 phr Water the balance Then, after mixing the following components, the mixture was filtered under pressure with a membrane filter having a pore size of 0.22 $\mu$m made by Sumitomo Electric Industries, Ltd., brand name: FLUOROPORE-FILTER, to prepare yellow Y1, magenta M1, cyan C1, and black K1 inks.

| The composition of yellow ink Y1 | |
| --- | --- |
| C.I. Direct Yellow 86 | 2 phr |
| Thiodiglycol | 10 phr |
| ACETYLENOL EH (brand name, made by Kawaken Fine Chemical) | 1 phr |
| Water | the balance |
| The composition of magenta ink M1 | |
| The same composition as Y1 except that the dyestuff is changed to 2.5 phr of C.I. Acid Red 289. | |
| The composition of cyan ink C1 | |
| The same composition as Y1 except that the dyestuff is changed to 2.5 phr of C.I. Acid Blue 9. | |
| The composition of black ink K1 | |
| The same composition as Y1 except that the dyestuff is changed to 4 phr of C.I. Food Black 2. | |

Recording was performed on copy paper made by Canon using the obtained liquid composition and color inks. A similar recording apparatus to that shown in FIG. 4 with five recording heads shown in FIG. 7 was used to form color images. Each recording head has a recording density of 360 dpi. The heads were driven with a drive frequency of 5 KHz, and the unit discharge volume was 40 pl/dot (pico-liters/dot) for the yellow, magenta, cyan and black inks and the liquid composition.

The recorded images were evaluated as follows:

1. Image Density

Solid images formed with the liquid composition and the inks were evaluated with an optical densitometer Macbeth RD915 made by Macbeth Corp. 12 hours after image formation. The results were expressed based on the following standard:

Excellent: an optical density of 1.30 or more

Good: an optical density of 1.25 or more and less than 1.30

Fair: an optical density of 1.15 or more and less than 1.25

No good: an optical density of less than 1.15

2. Fixing Property

After a red solid image was formed with the liquid composition, yellow ink and red ink on a copy sheet, other white paper sheets were put on the copy sheet and allowed to stand without additional weight. The measure of fixing property used was the time until transferring and contamination are not observed on the reverse side of the white paper sheet. The reference time is the time when recording was completed. The results were expressed based on the following standard:

Excellent: 20 seconds or less

Good: 20 seconds or more and less than 30 seconds

Fair: 30 seconds or more and less than 40 seconds

No good: 40 seconds or more

3. Character Quality

Black alphabetical and numerical characters recorded using the liquid composition and black ink were visually evaluated. Characters without noticeable feathering were evaluated as excellent, characters with feathering but practical were evaluated as good, and characters of less than this level were evaluated as no good.

4. Bleeding

Solid images next to each other were recorded with the liquid composition, yellow ink, magenta ink, cyan ink, and black ink by the same mode as print mode E, i.e. one pass, printing in one direction, in a color bubble-jet printer BJC-820J made by Canon. The extent of bleeding at the boundaries of different colors was evaluated visually. Substantially no bleeding was evaluated as excellent, a slight, practical bleeding level was evaluated as good and an unsatisfactory level was evaluated as no good.

5. Water Resistance of the Images

Solid images and alphabetical and numerical characters of yellow, magenta, cyan and black colors were printed on the sheet and allowed to stand for 1 hour. Then each printed sheet was immersed in tap water at 20° C. for 10 seconds. The sheet removed from the water was slightly pressed with a filter paper to remove water from the sheet, and then was air-dried. The water resistance was visually evaluated as follows:

Excellent: substantially no flow of the recording material to non-printed areas and no contamination;

Good: slight blurred characters due to flow of the recording material, but at a level acceptable in practice No Good: noticeable flow of the recording material; severe contamination and characters blurred to an impractical extent.

In EXAMPLE 1 and the COMPARATIVE EXAMPLE of the present invention, the liquid composition was adhered to the same regions in which inks formed images. The duty of printing was 100% for all of the liquid composition and inks. Moreover, the recording use carried out in one direction and the liquid composition use always discharged in advance of the inks.

Comparative Example

A recording and evaluation similar to EXAMPLE 1 was carried out except that the liquid composition used in EXAMPLE 1 was not used.

The results of evaluation tests of EXAMPLE 1 and the COMPARATIVE EXAMPLE are summarized in Table 1. Table 1 clearly demonstrates that all the results of fixing property, image density, character quality, bleeding, and water resistance are excellent or good in EXAMPLE 1, while an image having low image density, poor character quality and poor water resistance is obtainable from COMPARATIVE EXAMPLE.

TABLE 1

| Evaluation Items | EXAMPLE 1 | COMPARATIVE EXAMPLE |
|---|---|---|
| Image density | Excellent | Fair |
| Fixing property | Excellent | Excellent |
| Character quality | Good | N.G. |
| Bleeding | Excellent | Good |
| Water resistance | Excellent | N.G. |

Examples 2 to 9

Using the following liquid compositions A2 and A3, and the following recording inks I2 and I3, the same printing and evaluation as in EXAMPLE 1 were carried out by the combination of the liquid composition, ink and recording process shown in Table 2. The results are summarized in Table 3.

The composition of A2

| | |
|---|---|
| Cationic fluorocarbon surfactant: Compound No. 1 | 0.5 phr |
| Cationic surfactant: G-50 made by Sanyo Chemical Industries (laurylbenzyltrimethylammonium chloride) | 0.3 phr |
| Polymer: polyvinyl pyrrolidone (PVP-K-15, International Specialty Products, Mw = 8,000) | 5.0 phr |
| Thiodiglycol | 10.0 phr |
| Water | the balance |

The composition of A3

| | |
|---|---|
| Cationic fluorocarbon surfactant: Compound No. 2 | 0.05 phr |
| Polymer: polyaminesulfone hydrochloric acid (PAS-A5, Nittobo, Mw = 3,500) | 5.0 phr |
| Thiodiglycol | 10.0 phr |
| Water | the balance |

Preparation of I2 Black Ink
(Preparation of pigment dispersion)

The following components were mixed with each other, and the mixture was heated to 70° C. with a water bath to completely dissolve the resin component:

| | |
|---|---|
| Styrene-acrylic acid-ethyl acrylate copolymer (Acid value: 140, weight average molecular weight: 5000) | 1.5 phr |
| Monoethanolamine | 1 phr |
| Ion exchanged water | 81.5 phr |
| Diethylene glycol | 5 phr |

Into the solution, 10 phr of newly manufactured carbon black (made by MCF99 Mitshubishi Kasei Corp.) and 1 phr of isopropyl alcohol were added, and the solution was preliminarily mixed for 30 minutes before the following dispersion procedure:

Dispersing machine: Sand-Grinder (made by Amex Co. Ltd.,)
Pulverization media: Zirconium beads (1 mm in diameter)
Filling factor of pulverization media: 50%
Pulverization time: 3 hours After the mixture was centrifuged at 12,000 RPM for 20 minutes to eliminate coarse particles, the fluid dispersion was obtained.

(Preparation of Ink)

A black ink, I2, was prepared by mixing the following components:

| The above dispersion | 30 phr |
|---|---|
| Glycerine | 10 phr |
| Ethylene glycol | 5 phr |
| N-methyl pyrrolidone | 5 phr |
| Ethyl alcohol | 2 phr |
| Ion exchanged water | 48 phr |

Preparation of I2 Yellow Ink

By using an aqueous anionic polymer solution P-1 (styrene-acrylic acid-methyl methacrylate having an acid value of 280 and weight average molecular weight of 11,000, and containing 20 weight percent of solid component) neutralized with diethanolamine as a dispersant, the following yellow dispersion Y-2 was prepared:

| P-1 aqueous solution | 35 phr |
|---|---|
| Pigment Yellow 86 | 24 phr |
| Triethylene glycol | 10 phr |
| Diethylene glycol | 10 phr |
| Ethylene glycol monobutyl ether | 1.0 phr |
| Isopropyl alcohol | 0.5 phr |
| Water | 135 phr |

These materials were fed into a vertical batch sand mill, made by Amex Co. Ltd., and glass beads having a diameter of 1 mm were filled as media. The dispersion process was continued for 3 hours while cooling with water. The viscosity after dispersion was 9 cps, and the pH was 10.0. The fluid dispersion was centrifuged to eliminate coarse particles. The resulting dispersion Y-2 has an average diameter of 100 millimicrons.

An yellow ink-jet ink was obtained by thoroughly stirring the dispersion Y-2. The final product contains about 8 weight percent of solid components.

Preparation of I2 Cyan ink

The following cyan color dispersion C-2 was prepared by using the anionic polymer P-1 as a dispersant.

The composition of dispersion C-2:

| Aqueous P-1 solution (solid component: 20 weight percent) | 30 phr |
|---|---|
| Pigment Blue 15-3 (Fastogen Blue FGF made by Dainippon Ink and Chemicals, Inc.) | 24 phr |
| Glycerine | 15 phr |
| Diethylene glycol monobutyl ether | 0.5 phr |
| Isopropyl alcohol | 3 phr |
| Water | 135 phr |

The dispersion C-2 having an average diameter of 120 millimicrons was obtained from a dispersion procedure similar to EXAMPLE 1.

An cyan ink-jet ink was obtained by thoroughly stirring the dispersion C-2. The final product contains about 7.6 weight percent of solid components.

Preparation of I2 Magenta ink

The following magenta color dispersion M-2 was prepared by using the anionic polymer P-1 as a dispersant.

The composition of dispersion M-2:

| Aqueous P-1 solution (solid component: 20 weight percent) | 20 phr |
|---|---|
| Pigment Red 122 (made by Dainippon Ink and Chemicals, Inc.) | 24 phr |
| Glycerine | 15 phr |
| Isopropyl alcohol | 3 phr |
| Water | 135 phr |

The dispersion M-2 having an average diameter of 115 millimicrons was obtained from a dispersion procedure similar to EXAMPLE 1.

A magenta ink-jet ink was obtained by thoroughly stirring the dispersion M-2. The final product contains about 9.2 weight percent of solid components.

The Composition of I3 Inks

I3 black, yellow, cyan, and magenta inks were prepared from similar compositions to the I2 inks except that the dispersant was changed to polyvinyl pyrrolidone PVP K-15 (made by international Specialty Products, Mw=8,000), and 0.5 phr of anionic surfactant VIEWLIGHT ESS (made by Sanyo Chemicals, polyoxyethylene alkyl(C12 to C14) sulfosuccinic acid disodium(2E.O.) was added.

The obtained liquid compositions A2 and A3, and inks I2 and I3 are summarized with the recording order in Table 2.

TABLE 2

| EXAMPLES | Liquid Composition A | Ink I | Recording order |
|---|---|---|---|
| 2 | A2 | I2 | A2 before I2 |
| 3 | A2 | I2 | A2 after I2 |
| 4 | A2 | I3 | A2 before I3 |
| 5 | A2 | I3 | A2 after I3 |
| 6 | A3 | I2 | A3 before I2 |
| 7 | A3 | I2 | A3 after I2 |
| 8 | A3 | I3 | A3 before I3 |
| 9 | A3 | I3 | A3 after I3 |

Table 3 shows the results of evaluation of EXAMPLES 2 to 9.

TABLE 3

| EXAMPLES | Image Density | Fixing Property | Character Quality | Bleeding | Water Resistance |
|---|---|---|---|---|---|
| 2 | Good | Excellent | Excellent | Excellent | Excellent |
| 3 | Good | Exellent | Good | Good | Excellent |
| 4 | Good | Excellent | Excellent | Excellent | Excellent |
| 5 | Good | Excellent | Excellent | Good | Excellent |
| 6 | Excellent | Excellent | Excellent | Excellent | Excellent |
| 7 | Excellent | Excellent | Good | Good | Excellent |
| 8 | Excellent | Excellent | Excellent | Excellent | Excellent |
| 9 | Excellent | Excellent | Excellent | Good | Excellent |

As described above, the present invention can provide a rapidly fixed image, without bleeding, having excellent character quality, and excellent water resistance when performing color ink-jet recording on plain paper.

While the present invention has been described with reference to what are presently considered to be the preferred embodiments, it is to be understood that the invention is not limited to the disclosed embodiments. To the contrary, the invention is intended to cover various modifications and equivalent arrangements, included within the spirit and scope of the appended claims. The scope of the following claims is to be accorded the broadest interpretation so as to encompass all such modifications and equivalent structures and functions.

What is claimed is:

1. A liquid composition containing a cationic fluorocarbon surfactant having a general formula [I] or [II] and a polymer material in a solvent:

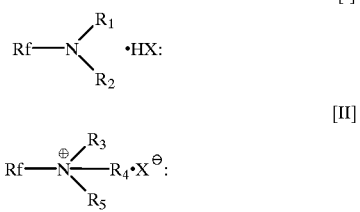

wherein Rf represents a fluorocarbon group in which at least a part of hydrogen atoms in an alkyl group having 4 to 12 carbon atoms are substituted by fluorine atoms, each of $R_1$, $R_2$, $R_3$, $R_4$, and $R_5$ represents a hydrogen atom or an alkyl group having 1 to 3 carbon atoms, HX represents a hydrohalogenic acid, and $X^\ominus$ represents a halogen anion.

2. A liquid composition containing a cationic fluorocarbon surfactant having a general formula [III] and a polymer material in a solvent:

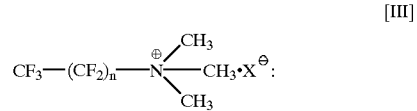

wherein n represents an integer from 4 to 12, and $X^\ominus$ represents a halogen anion.

3. A liquid composition according to claim 1, wherein said polymer material has a weight average molecular weight of 2,000 or more.

4. A liquid composition according to claim 1, wherein said liquid composition contains 0.001 to 1.0 weight percent of said surfactant.

5. A liquid composition according to claim 1, wherein said liquid composition contains 0.005 to 0.2 weight percent of said surfactant.

6. A liquid composition according to claim 1, wherein said liquid composition further contains another cationic compound.

7. A liquid composition according to claim 1, wherein the content of said polymer material ranges from 0.05 to 20 weight percent.

8. A liquid composition according to claim 1, wherein said solvent includes water and/or a water-soluble organic solvent.

9. A liquid composition according to claim 2, wherein said liquid composition contains a cationic surfactant in which n is from 7 to 10, and X is chlorine in said general formula [III].

10. A liquid composition according to claim 2, wherein said polymer material has a weight average molecular weight of 2,000 or more.

11. A liquid composition according to claim 2, wherein said liquid composition contains 0.001 to 1.0 weight percent of said surfactant.

12. A liquid composition according to claim 2, wherein said liquid composition contains 0.005 to 0.2 weight percent of said surfactant.

13. A liquid composition according to claim 2, wherein said liquid composition further contains another cationic compound.

14. A liquid composition according to claim 2, wherein the content of said polymer material ranges from 0.05 to 20 weight percent.

15. A liquid composition according to claim 2 wherein said solvent includes water and/or a water-soluble organic solvent.

16. A liquid composition for use in color image recording with a color ink containing an anionic compound, and for ejecting from an orifice of an ink-jet printer, comprising a compound represented by the following formula [I] or [II], an aqueous liquid medium and a nonionic polymer or a cationic polymer which are dissolved, dispersed or emulsified in the aqueous liquid medium:

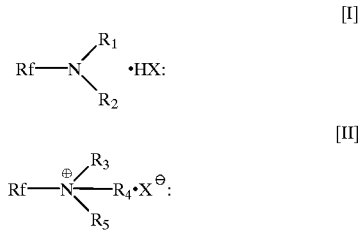

wherein Rf represents a fluorocarbon group in which at least a part of hydrogen atoms in an alkyl group having 4 to 12 carbon atoms are substituted by fluorine atoms, each of $R_1$, $R_2$, $R_3$, $R_4$ and $R_5$ represents a hydrogen atom or an alkyl group having 1 to 3 carbon atoms, HX represents a hydrohalogenic acid, and $X^\ominus$ represents a halogen anion.

* * * * *

UNITED STATES PATENT AND TRADEMARK OFFICE
CERTIFICATE OF CORRECTION

PATENT NO. : 5,985,975

DATED : November 16, 1999

INVENTOR(S) : YUTAKA KURABAYASHI, ET AL.

Page 1 of 2

It is certified that error appears in the above-identified patent and that said Letters Patent is hereby corrected as shown below:

ON THE COVER PAGE:

Item [75] Inventors

"Yutaka Kurabayashi, Tolorozawa;" should read --Yutaka Kurabayashi, Tokorozawa;--.

IN THE DISCLOSURE:

COLUMN 4:

Line 31, "As" should read --At--.
Line 67, "or" should read --or [II];--.

COLUMN 11:

Line 4, "acethylene" should read --acetylene--.
Line 28, "or" should read --of--.

COLUMN 14:

Line 53, "The composition of magenta ink M1" should read --The composition of magenta ink m1--.

UNITED STATES PATENT AND TRADEMARK OFFICE
CERTIFICATE OF CORRECTION

PATENT NO. : 5,985,975

DATED : November 16, 1999

INVENTOR(S) : YUTAKA KURABAYASHI, ET AL.     Page 2 of 2

It is certified that error appears in the above-identified patent and that said Letters Patent is hereby corrected as shown below:

COLUMN 14:

Line 56, "The composition of cyan ink C1" should read --The composition of cyan ink C1--.

Line 59, "The composition of black ink K1" should read --The composition of black ink K1--.

COLUMN 16:

Line 2, "use" should read --was--.
Line 3, "use" should read --was--.
Line 52, "Preparation of I2 Black Ink" should read --Preparation of I2 Black Ink--.
Line 54, Horizontal rule should be deleted.
Line 59, Horizontal rule should be deleted.

Signed and Sealed this

Fourteenth Day of November, 2000

Attest:

Q. TODD DICKINSON

*Attesting Officer*     *Director of Patents and Trademarks*